United States Patent
Park

(10) Patent No.: US 9,907,088 B2
(45) Date of Patent: Feb. 27, 2018

(54) METHOD OF SHARING RESOURCE ALLOCATION INFORMATION AND BASE STATION APPARATUS THEREFOR

(71) Applicant: ELECTRONICS AND TELECOMMUNICATIONS RESEARCH INSTITUTE, Daejeon (KR)

(72) Inventor: Man Ho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 169 days.

(21) Appl. No.: 14/983,515

(22) Filed: Dec. 29, 2015

(65) Prior Publication Data

US 2016/0192371 A1    Jun. 30, 2016

(30) Foreign Application Priority Data

Dec. 30, 2014  (KR) .................. 10-2014-0194065
Oct. 19, 2015  (KR) .................. 10-2015-0145338

(51) Int. Cl.
*H04W 72/12*  (2009.01)
*H04W 88/08*  (2009.01)

(52) U.S. Cl.
CPC ...... *H04W 72/1257* (2013.01); *H04W 72/121* (2013.01); *H04W 88/08* (2013.01)

(58) Field of Classification Search
CPC ................................ H04W 72/1257
See application file for complete search history.

(56) References Cited

U.S. PATENT DOCUMENTS

| 2006/0240838 A1* | 10/2006 | Suh ........................ H04W 16/32 455/454 |
| 2007/0054681 A1* | 3/2007 | Suh ........................ H04W 48/12 455/502 |
| 2008/0232267 A1* | 9/2008 | Kim ..................... H04L 41/5019 370/252 |
| 2009/0097423 A1* | 4/2009 | Choi ................. H04W 72/0453 370/280 |
| 2009/0149188 A1* | 6/2009 | McBeath .............. H04W 72/04 455/450 |
| 2009/0252089 A1 | 10/2009 | Lim et al. |
| 2009/0296622 A1* | 12/2009 | Pisut ................... H04W 72/048 370/312 |

(Continued)

FOREIGN PATENT DOCUMENTS

KR    10-2008-0005060 A    1/2008
KR    10-2008-0085993 A    9/2008

(Continued)

*Primary Examiner* — Gary Mui
(74) *Attorney, Agent, or Firm* — Rabin & Berdo, P.C.

(57) ABSTRACT

Various exemplary embodiments of the present invention relate to a base station apparatus including: an information receiving module which receives information used for scheduling from a plurality of terminals corresponding to the base station apparatus; and a scheduler which generates resource allocation information for one shared FA among a plurality of FAs which is available in the base station apparatus based on the received information and applies the generated resource allocation information to at least one other shared FA.

12 Claims, 4 Drawing Sheets

(56) References Cited

U.S. PATENT DOCUMENTS

| | | | |
|---|---|---|---|
| 2009/0298498 A1* | 12/2009 | Pisut | H04L 5/0005 |
| | | | 455/434 |
| 2010/0054198 A1* | 3/2010 | Sung | H04L 5/0037 |
| | | | 370/329 |
| 2011/0119385 A1* | 5/2011 | Lee | H04W 72/0453 |
| | | | 709/226 |
| 2011/0310792 A1 | 12/2011 | Lee et al. | |
| 2012/0213089 A1* | 8/2012 | Shi | H04L 5/001 |
| | | | 370/241 |
| 2016/0242200 A1* | 8/2016 | Yan | H04W 72/1263 |

FOREIGN PATENT DOCUMENTS

| KR | 10-2009-0066056 A | 6/2009 |
|---|---|---|
| KR | 10-2009-0114879 A | 11/2009 |
| KR | 10-2010-0027301 A | 3/2010 |

\* cited by examiner

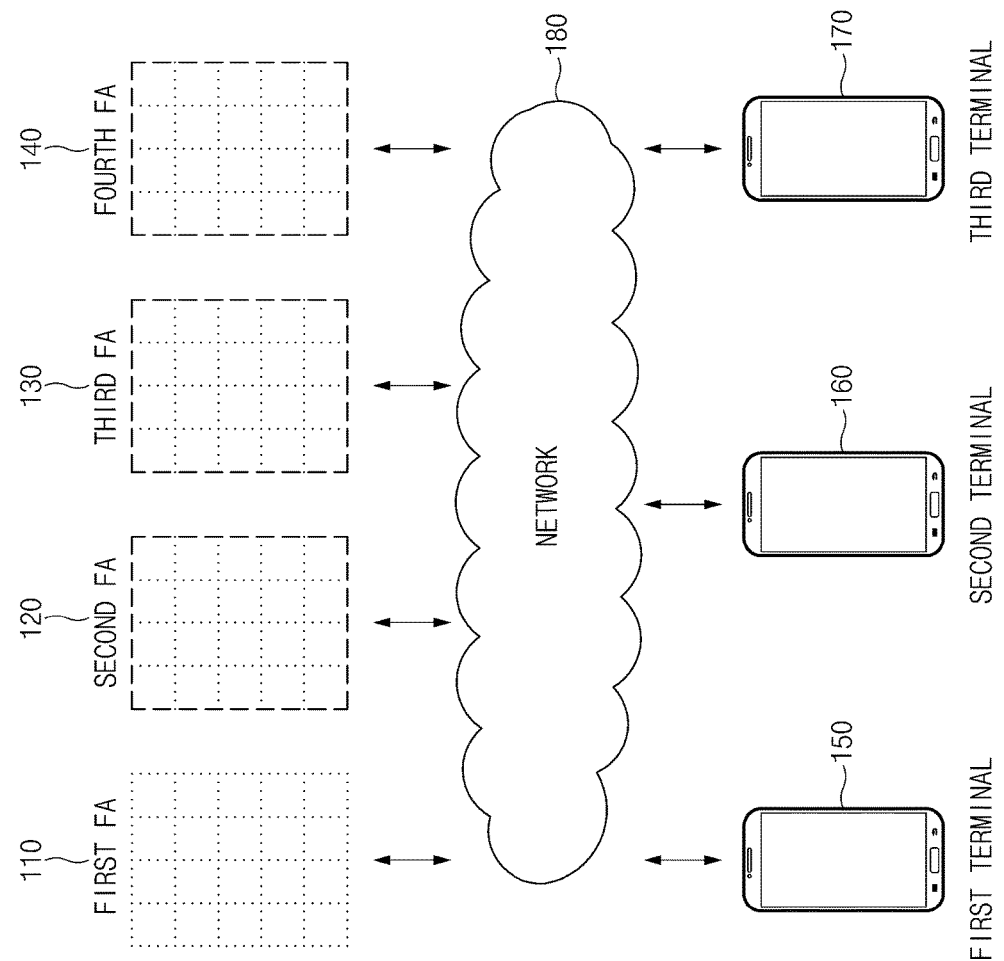
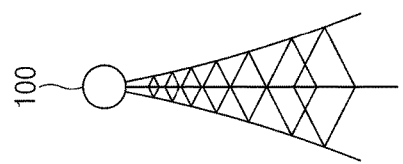
FIG.1

METHOD OF SHARING RESOURCE ALLOCATION INFORMATION AND BASE STATION APPARATUS THEREFOR

CROSS-REFERENCE TO RELATED APPLICATIONS

This application claims priority to and the benefit of Korean Patent Application Nos. 10-2014-0194065 and 10-2015-0145338 filed in the Korean Intellectual Property Office on Dec. 30, 2014 and Oct. 19, 2015, respectively, the entire contents of which are incorporated herein by reference.

TECHNICAL FIELD

The present invention relates to a method of sharing resource allocation information and a base station apparatus for performing the same, and more particularly, to an efficient communication resource allocating method to perform communication using a multiple frequency allocation (FA) connection method in an ultrafast broadband wireless communication system.

Specifically, the present invention relates to a method of generating resource allocation information to a plurality of terminals for one shared FA in a wireless communication system using a multiple FA and sharing the generated resource allocation information with another shared FA, and a base station apparatus.

BACKGROUND ART

Recently, a wireless communication system is developed based on lots of core techniques and one of the core techniques is an orthogonal frequency division multiplexing (OFDM) method. Differently from an existing multi-carrier technique, according to the OFDM technique, adjacent carrier waves maintain orthogonality so that spectrum efficiency is relatively high. When the OFDM technique is applied to a broadband frequency band, it shows a characteristic which is resistant to frequency selective fading as compared with a single frequency system, so that the OFDM technique is adopted in the recent communication system to replace the existing modulating and demodulating technique. An improved OFDMA system in the OFDM method appropriately allocates and uses resources in a time-frequency domain to share the carrier by several users, thereby increasing efficiency. A communication system which is currently used has a wider band width which is used to efficiently transmit data and calculates allocation resource distribution applied for transmission for every communication frame in order for a user who uses the service to efficiently share and use a limited resource in accordance with the OFDMA method and transmits the information suitable therefor.

Thereafter, a multiple FA communication technique which is used by combining several FAs, which appears in accordance with development of the communication system and data quantity which is suddenly increased by an ultrafast data communication system as compared with the related art have large restrictions to actively distribute resources to the plurality of terminals in a limited time of a communication frame, without being delayed. That is, in order to efficiently operate the ultrafast broadband wireless communication system of a multiple FA connection method, it is required to reduce complexity of allocating resources using a multiple FA, reduce a size of resource control information generated for every FA, and prevent delay which may be generated in the resource allocating process.

SUMMARY OF THE INVENTION

Various exemplary embodiments of the present invention have been made in an effort to provide a method of sharing resource allocation information and an electronic apparatus which performs the same.

A technical object to be solved by the various exemplary embodiments of the present invention is to efficiently process the resource allocating method to the multiple FA to reduce complexity for the resource allocation, reduce control information amount for the resource allocation, and prevent the service from being delayed by the processing process when an ultrafast broadband wireless communication service using a multiple FA connection method is provided to the user.

Technical objects of the present invention are not limited to the aforementioned technical objects and other technical objects which are not mentioned will be apparently appreciated by those skilled in the art from the following description.

Various exemplary embodiment of the present invention provide a base station apparatus including: an information receiving module which receives information used for scheduling from a plurality of terminals corresponding to the base station apparatus; and a scheduler which generates resource allocation information for one shared FA among a plurality of FAs which is available in the base station apparatus based on the received information and applies the generated resource allocation information to at least one other shared FA.

According to the various exemplary embodiments of the present invention, the scheduler may determine the plurality of FAs corresponding to the base station apparatus as a shared FA to which a resource allocation information sharing method is applied and a non-shared FA to which the resource allocation information sharing method is not applied.

According to the various exemplary embodiments of the present invention, an operation of generating resource allocation information for one shared FA among the plurality of FAs and applying the generated resource allocation information to another shared FA may be performed on a shared FA which is determined to adopt the resource allocation information sharing method thereto.

According to the various exemplary embodiments of the present invention, the resource allocation information may include resource allocation information for a smaller value between a minimum value of resource amounts which are calculated as resource amounts which are available for the resource allocation information sharing method among total resource amounts of one shared FA, for each of the plurality of shared FAs, and a sum of quotients obtained by dividing necessary resource amounts of each of the plurality of terminals by the number of shared FAs.

According to the various exemplary embodiments of the present invention, the resource amount which is available for the resource allocation information sharing method may be obtained by excluding a resource amount allocated for control and retransmission from the resources of the FAs.

According to the various exemplary embodiments of the present invention, when the minimum value of the resource amounts which are calculated for each of the plurality of shared FAs is smaller than the sum of quotients obtained by dividing necessary resource amounts of each of the plurality of terminals by the number of shared FAs, the scheduler may select one terminal in accordance with a priority based on a scheduling policy to reduce a resource amount for every terminal of the selected terminal, thereby generating the resource allocation information.

According to the various exemplary embodiments of the present invention, the resource allocation information may include allocation information which allocates a non-allocated resource to the region which is not a target of the resource allocation information sharing method among resources of each of the shared FAs.

Various exemplary embodiments of the present invention provide a method which is performed in a base station apparatus, the method including: receiving information used for scheduling from a plurality of terminals corresponding to the base station apparatus; and generating resource allocation information on one shared FA among a plurality of FAs which is available for the base station, based on the received information; and applying the generated resource allocation information to at least one other shared FA.

According to the various exemplary embodiments of the present invention, the method may further include determining the plurality of FAs corresponding to the base station apparatus as a shared FA to which a resource allocation information sharing method is applied and a non-shared FA to which the resource allocation information sharing method is not applied.

According to the various exemplary embodiments of the present invention, the generating of resource allocation information for one shared FA among the plurality of FAs and the applying of the generated resource allocation information to another shared FA may be performed on a shared FA which is determined to adopt the resource allocation information sharing method thereto.

According to the various exemplary embodiments of the present invention, the generating of resource allocation information may include: calculating resource amounts which are available for the resource allocation information sharing method among total resource amounts of one shared FA, for each of the plurality of shared FAs; calculating a sum of quotients obtained by dividing necessary resource amounts of each of the plurality of terminals by the number of shared FAs; and determining a smaller value between the available resource amount which is calculated for each of the plurality of shared FAs and the sum of quotients obtained by dividing the necessary resource amounts by the calculated number of shared FAs. According to the various exemplary embodiments of the present invention, the generating of resource allocation information may further include: allocating a non-allocated resource to a region which is not a target of the resource allocation information sharing method among resources of each of the shared FAs.

According to the various exemplary embodiments of the present invention, resource allocation information is shared to separately provide information on a shared resource for every FA and information on a non-shared resource. As a result, when several FAs use the resource allocation information sharing method, a size of the entire control information is reduced to allocation information for one shared resource, additional information related with the shared resource, and individual resource information for every FA which is different for every FA.

According to the various exemplary embodiments of the present invention, when an ultrafast data service is provided using a broadband wireless communication system of a multiple FA connection method, a method of sharing resource allocation information for every FA in each communication frame and commonly applying the information is applied to reduce a calculation amount required for resource allocation processing, reduce an amount of control information, and reduce delay which may occur during the process, thereby efficiently distributing ultrafast broadband wireless communication resources.

BRIEF DESCRIPTION OF THE DRAWINGS

FIG. 1 is a view illustrating a wireless communication system including a base station apparatus and a plurality of terminals according to various exemplary embodiments of the present invention.

Figure 2:
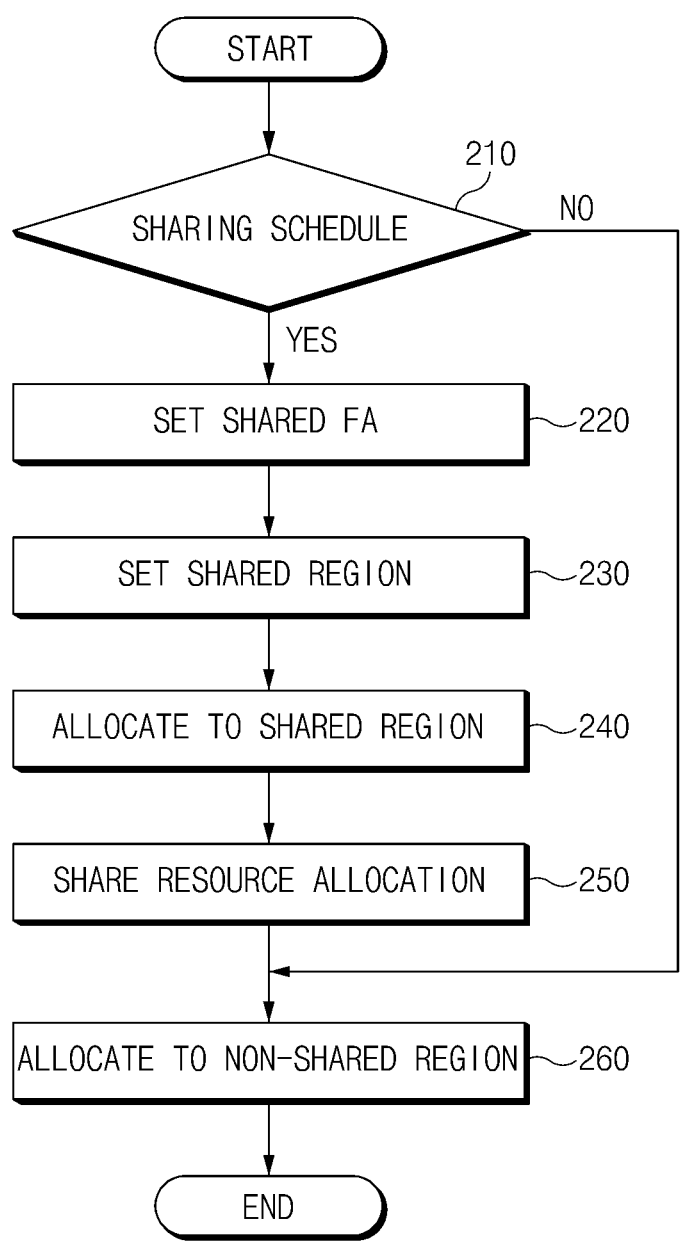
FIG. 2 is a flowchart illustrating a method of allocating resources in a multiple FA connection method according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to accompanying drawings. In this case, like components are denoted by like reference numerals in the drawings as much as possible. Further, a detailed description of a function and/or a configuration which has been already publicly known will be omitted. In the following description, parts which are required to understand an operation according to various exemplary embodiments will be mainly described and a description of components which may cloud a gist of the description will be omitted. Some components of the drawings will be exaggerated, omitted, or schematically illustrated. However, a size of the component does not completely reflect an actual size and thus the description is not limited by a relative size or interval of the components illustrated in the drawings.

FIG. 1 is a view illustrating a wireless communication system including a base station apparatus and a plurality of terminals according to various exemplary embodiments of the present invention.

Referring to FIG. 1, the wireless communication system includes a base station apparatus 100, a first frequency allocation (FA) 110, a second FA 120, a third FA 130, and a fourth FA 140 which are controllable by the base station apparatus 100, a first terminal 150, a second terminal 160, and a third terminal 170 located in positions corresponding to the base station apparatus 100, and a network 180.

It is assumed that the base station apparatus 100 controls a total of four FAs (the first FA 110, the second FA 120, the third FA 130, and the fourth FA 140) which allocate resources to the first terminal 150, the second terminal 160, and the third terminal 170.

When the resources are allocated to the first terminal 150, the second terminal 160, and the third terminal 170 from the first FA 110, the second FA 120, the third FA 130, and the fourth FA 140, the base station apparatus 100 may select a shared FA to which a resource allocation information sharing method is applied. An operation for selecting a shared FA among the plurality of FAs may be performed in consideration of conditions of the plurality of FAs.

In FIG. 1, it is assumed that the base station apparatus 100 selects the second FA 120, the third FA 130, and the fourth FA 140 among the first FA 110, the second FA 120, the third FA 130, and the fourth FA 140, as shared FAs.

The base station apparatus 100 may calculate a resource amount which is used for the resource allocation information sharing method, from a total resource amount of one FA, for the second FA 120, the third FA 130, and the fourth FA 140.

The base station apparatus 100 may calculate a resource amount required for the first terminal 150, the second terminal 160, and the third terminal 170.

The base station apparatus 100 may perform resource allocation scheduling to allocate the resource from the second FA 120 to the first terminal 150, the second terminal 160, and the third terminal 170 based on a minimum value of the calculated resource amounts.

The resource allocation scheduling performed on the second FA 120 may also be performed on the third FA 130 and the fourth FA 140.

The base station apparatus 100 may allocate the resources to the first FA 110 to which the resource allocation information sharing method is not applied and a region of a total resource amount of each of the second FA 120, the third FA 130, and the fourth FA 140 to which the resource is not allocated.

The network 180 may connect the base station apparatus 100, the first FA 110, the second FA 120, the third FA 130, and the fourth FA 140 and the first terminal 150, the second terminal 160, and the third terminal 170 using various communication methods.

FIG. 2 is a flowchart illustrating a method of allocating resources in a multiple FA connection method according to various exemplary embodiments of the present invention. The resource allocating method may be utilized in the ultrafast broadband wireless communication system. The resource allocating method illustrated in FIG. 2 may be performed in the base station apparatus 100 illustrated in FIG. 1. Therefore, even though it is omitted in FIG. 2, description on a method in which the base station apparatus 100 described with reference to FIG. 1 allocates the resource may be applied to the resource allocating method of FIG. 2.

Each terminal which is connected to the base station apparatus 100 by the multiple FA method needs to pass through a process of selecting a size of a communication resource to be allocated for every terminal, a modulating/encoding method, and a location of a resource for every terminal used for every frame in advance in cooperation with the base station apparatus, so that the resource is allocated thereto.

In operation 210, the base station apparatus 100 may determine whether to apply the resource allocation information sharing method as a communication resource allocating method for the terminals. When the base station apparatus 100 determines to apply the resource allocation information sharing method, operation 210 may proceed to operation 220. When the base station apparatus 100 determines not to apply the resource allocation information sharing method, operation 210 may proceed to operation 260. If the resource allocation information sharing method is not applied, the base station apparatus 100 may configure individual allocation information for the frequency resources for each FA similarly to the existing method and transmit the allocation information to each terminal, and transmit data using the information.

In operation 220, the base station apparatus 100 may select a target FA to which the resource allocation information sharing method is applied among a plurality of FAs based on the size of the communication resource which will be allocated to each terminal, the modulating/encoding method, and a service policy. For example, when channel statuses of three FAs among the total of four FAs show a similar status at a predetermined level, the base station apparatus 100 may determine the three FAs as a target of the resource allocation information sharing method.

In operation 230, the base station apparatus 100 may calculate a resource amount to be transmitted in consideration of an amount of resources available for the resource allocation information sharing method for every target FA determined in operation 220 and an amount of resources which are spent by each terminal and confirm the amount of resources to be processed by the resource allocation information sharing method based on the calculated resource amount.

In operation 240, the base station apparatus 100 may configure a resource allocating table such that the data is allocated as much as a resource amount designated for one FA by the resource allocation information sharing method.

In operation 250, the base station apparatus 100 may apply the allocation table configured for one FA in operation 240 to another sharing target FA.

In operation 260, the base station apparatus 100 may additionally allocate the resource for a resource region which is not distributed by the resource allocation information sharing method.

FIGS. 3A-3F are views illustrating methods of allocating a resource by a base station apparatus 100, according to various exemplary embodiments of the present invention.

Figure 3:
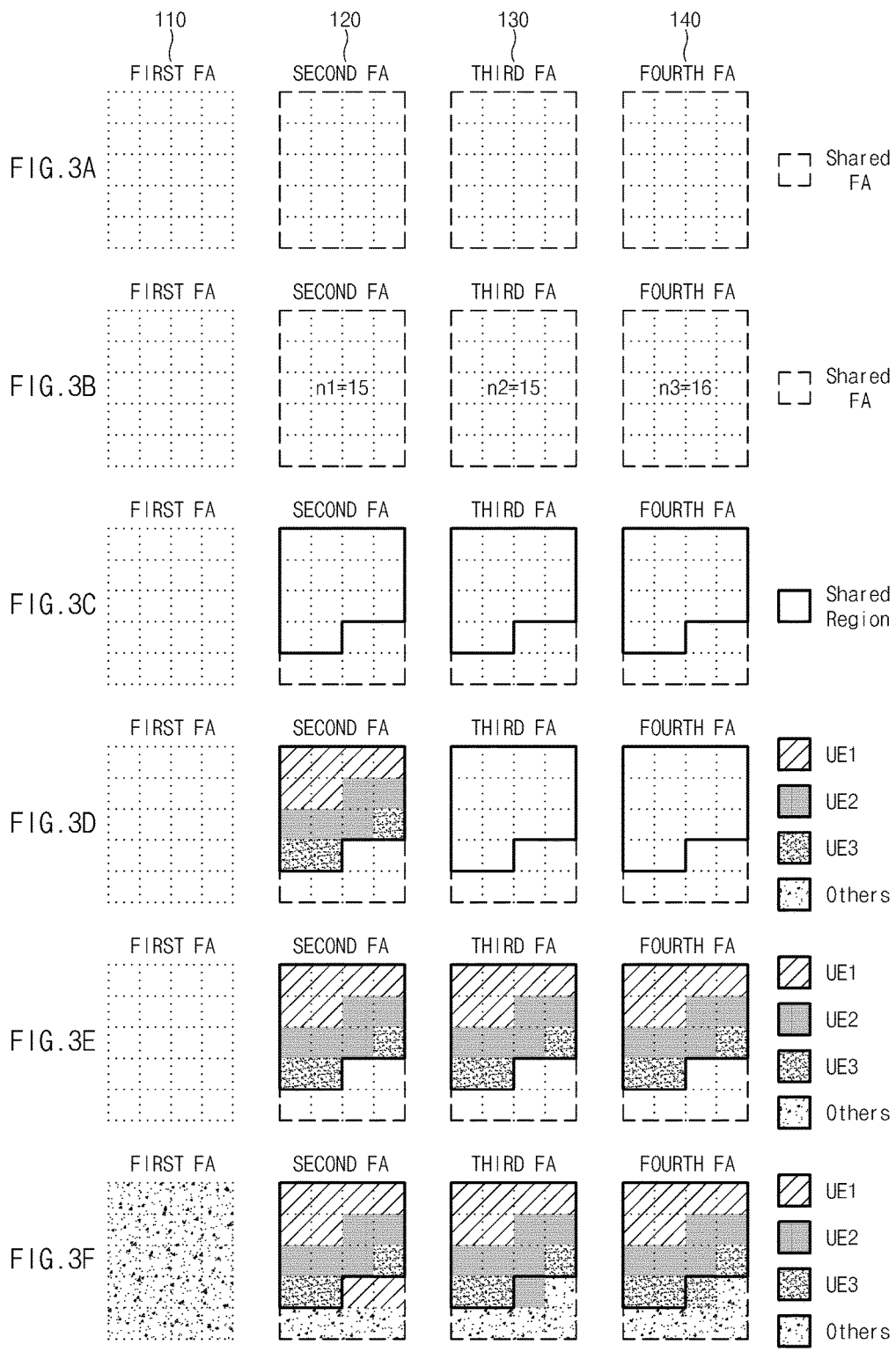
FIGS. 3A-3F are views illustrating methods of allocating a resource by a base station apparatus 100, according to various exemplary embodiments of the present invention.

In FIG. 3A, the base station apparatus 100 may determine the number M of FAs to which a resource is allocated by the resource allocation information sharing method among the total number L of FAs used by the base station apparatus 100 to allocate the resource.

For example, it is assumed that the total number L of FAs used by the base station apparatus 100 to allocate the resources is four. The base station apparatus 100 may determine to allocate the resource to the first FA among four FAs in accordance with the method of the related art and allocate the resources to the second FA, the third FA, and the fourth FA by the resource allocation information sharing method.

According to the various exemplary embodiments of the present invention, several factors at a time when the communication service is provided may be considered for an operation of the base station apparatus 100 which determines the resource allocating method for each of the plurality of FAs.

In FIG. 3B, the base station apparatus 100 may calculate an amount of resources which may be applied to the allocation information sharing method for every FA. The amount of resources which may be applied to the allocation information sharing method may be an amount obtained by subtracting a resource amount which is allocated for control and retransmission from a resource amount (entire frame) which is available for each FA.

Each of n1, n2, and n3 illustrated in FIG. 3B represents an amount of resources available for the resource allocation information sharing method in the second FA, the third FA, and the fourth FA. For example, 15 resources among resources of the second FA are available for the resource allocation information sharing method, 15 resources among resources of the third FA are available for the resource allocation information sharing method, and 16 resources among resources of the fourth FA are available for the resource allocation information sharing method.

In FIG. 3C, the base station apparatus 100 may determine a minimum value of the resources which are available for the resource allocation information sharing method in each FA by a resource amount which is processed by a primary resource allocation information sharing method.

For example, when the amounts of resources available for the resource allocation information sharing method in the second FA, the third FA, and the fourth FA are n1, n2, and n3, respectively, an amount N of a common resource which is primarily available for the resource allocation information sharing method may be min(n1, n2, n3). Therefore, referring to FIG. 3B, the amount N of the common resource which is primarily available for the resource allocation information sharing method is min(15, 15, 16), that is, 15.

The base station apparatus 100 may calculate an amount S of resources which are required to be allocated to each FA by the resource allocation information sharing method from the consumed resource amount of each terminal.

When the consumed resource amounts of the first terminal, the second terminal, and the third terminal are u1, u2, and u3, respectively, the consumed resource amount of any one terminal may be represented by Equation 1.

$$u_i = s_i * M + r_i \text{ (}i\text{ is an identification number of terminal)} \quad \text{[Equation 1]}$$

In this case, each of s1, s2, and s3 is a value corresponding to a quotient of a value obtained by dividing $u_i$ by M which is the number of shared FAs and is considered as a consumed resource amount for every terminal which is equally distributed to each FA by the resource allocation information sharing method.

Therefore, the amount S of resources which are required to be allocated to each FA by the resource allocation information sharing method is primarily s1+s2+s3 and the total amount of the resources which are required to be allocated to the entire FAs by the resource allocation information sharing method may be M*S based on the consumed resource amount for every terminal.

According to the various exemplary embodiments of the present invention, the base station apparatus 100 may finally confirm the resource amount K which is commonly available for each FA using the above values to be a value of min(N, S).

For example, in the first terminal, the second terminal, and the third terminal, when resource amounts required to transmit data are 20, 16, 10, {s1, s2, s3} may be {6, 5, 3}. In this case, the amount S of resources required to be allocated to each FA may be 14. Therefore, the resource amount K which is finally used for the resource allocation information sharing method is min(15, 14), that is, 14.

When an amount N of common resources which are actually available is smaller than the amount S of resources required to be allocated to each FA, one terminal is selected based on a priority base station resource allocation guideline which is similar to a priority of the terminals to reduce the resource amount for every terminal of the corresponding terminal, thereby recalculating the resource amount. For example, in the above condition, when the amount N of common resources which are actually available is not 15, but 13, the base station apparatus 100 may perform a recalculating process by correcting s3 from 3 to 2.

In FIG. 3D, the base station apparatus 100 may allocate the resources to the first terminal, the second terminal, and the third terminal for one FA based on the amount K of resources which are commonly available for each FA.

In FIG. 3E, the base station 100 may allocate the resource to another FA (another FA to which the resource allocation information sharing method is applied) as much as the resource which is allocated to the first terminal, the second terminal, and the third terminal for one FA, as illustrated in FIG. 3D.

In FIG. 3F, the base station apparatus 100 may appropriately allocate a resource which has not yet been allocated to a region which is not a target of the resource allocation information sharing method. The non-allocated resource may include a resource which is not allocated to each terminal like $r_i$ of Equation 1 or a resource which is separately processed for every FA. The resource which is separately processed for every FA may be a resource which is separately allocated for control and retransmission.

According to the various exemplary embodiments of the present invention, when the resource allocation information is shared according to the above method, information on a shared resource for every FA and information on a non-shared resource may be separately provided. As a result, when several FAs use the resource allocation information sharing method, a size of the entire control information is reduced to allocation information for one shared resource, additional information related with the shared resource, and individual resource information for every FA which is different for every FA.

According to the various exemplary embodiments of the present invention, when an ultrafast data service is provided using a broadband wireless communication system of a multiple FA connection method, a method of sharing resource allocation information for every FA in each communication frame and commonly applying the information is applied to reduce a calculation amount required for resource allocation processing, reduce an amount of control information, and reduce delay which may occur during the process, thereby efficiently distributing ultrafast broadband wireless communication resources.

Figure 4:
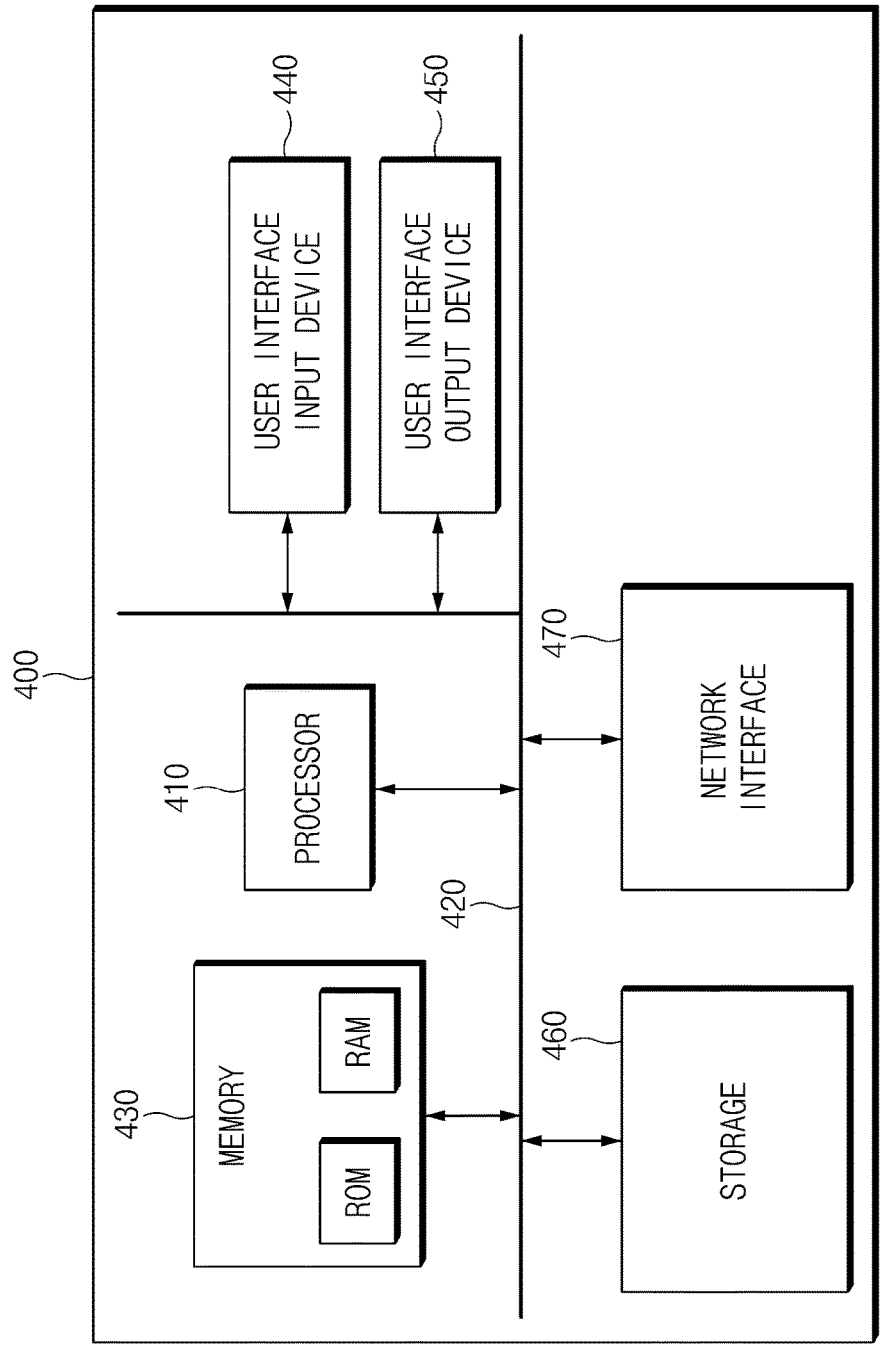
FIG. 4 is a diagram of a base station apparatus according to another exemplary embodiment of the present invention.

FIG. 4 is a diagram of a base station apparatus 400 according to another exemplary embodiment of the present invention. Referring to FIG. 4, a base station apparatus 400 may include at least one processor 410, a bus 420, a memory 430, a user interface input device 440, a user interface output device 450, a storage 460, and a network interface 470 which are connected to each other through a bus 420.

The processor 410 may be a semiconductor device which performs processings on commands which are stored in a central processing unit (CPU), or the memory 430 and/or the storage 460. The memory 430 and the storage 460 may include various types of volatile or non-volatile storage media. For example, the memory 430 may include a read only memory (ROM) and a random access memory (RAM).

Therefore, the method or the step of the algorithm which has been described regarding the exemplary embodiments disclosed in the specification may be directly implemented by a hardware or software module which is executed by the processor 410 or a combination thereof. The software module may be stayed in a storage medium (that is, the memory 430 and/or the storage 460) such as a RAM, a flash memory, a ROM, an EPROM, an EEPROM, a register, a hard disk, a detachable disk, or a CD-ROM. An exemplary storage medium is coupled to the processor 410 and the processor 410 may read information from the storage medium and write information in the storage medium. As another method, the storage medium may be integrated with the processor 410. The processor and the storage medium may be stayed in an application specific integrated circuit (ASIC). The ASIC may be stayed in a base station apparatus. As another method, the processor and the storage medium may be stored in the base station apparatus as individual components.

The specified matters and limited exemplary embodiments and drawings such as specific elements in the present invention have been disclosed for broader understanding of the present invention, but the present invention is not limited to the exemplary embodiments, and various modifications and changes are possible by those skilled in the art without departing from an essential characteristic of the present invention. Therefore, the spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A base station apparatus, comprising:
    a receiving means which receives information used for scheduling from a plurality of terminals corresponding to the base station apparatus; and
    a scheduler which determines two or more shared frequency allocations (FAs) among a plurality of FAs which is available in the base station apparatus based on the received information, generates resource allocation information for a first shared FA among the two or more shared FAs based on a number of shared FAs, necessary resource amounts of each of the plurality of terminals, and a minimum value between available resource amounts for the plurality of terminals among total resource amounts of each of the two or more shared FAs, and applies the generated resource allocation information to remaining shared FAs, other than the first shared FA, from the two or more shared FAs.

2. The base station apparatus of claim 1, wherein the scheduler determines the plurality of FAs corresponding to the base station apparatus as a shared FA to which a resource allocation information sharing method is applied and a non-shared FA to which the resource allocation information sharing method is not applied.

3. The base station apparatus of claim 2, wherein an operation of generating resource allocation information for the first shared FA among the plurality of FAs and applying the generated resource allocation information to the remaining shared FAs is performed on a shared FA which is determined to adopt the resource allocation information sharing method thereto.

4. The base station apparatus of claim 1, wherein the resource allocation information is generated based on the minimum value and a sum of quotients obtained by dividing the necessary resource amounts by the number of shared FAs.

5. The base station apparatus of claim 4, wherein the available resource amounts are obtained by excluding a resource amount allocated for control and retransmission from the total resources amounts of the two or more shared FAs.

6. The base station apparatus of claim 4, wherein when the minimum value is smaller than the sum of quotients,
    the scheduler selects one terminal in accordance with a priority based on a scheduling policy to reduce a resource amount for every terminal of the selected terminal, thereby generating the resource allocation information.

7. The base station apparatus of claim 4, wherein the resource allocation information includes allocation information which allocates a non-allocated resource to a region which is not a target of the resource allocation information sharing method among resources of each of the two or more shared FAs.

8. A method performed in a base station apparatus, the method comprising:
    receiving information used for scheduling from a plurality of terminals corresponding to the base station apparatus;
    determining two or more shared frequency allocations (FAs) among a plurality of FAs which is available in the base station apparatus based on the received information;
    generating resource allocation information for a first shared FA among the two or more shared FAs based on a number of shared FAs, necessary resource amounts of each of the plurality of terminals, and a minimum value between available resource amounts for the plurality of terminals among total resource amounts of each of the two or more shared FAs; and
    applying the generated resource allocation information to remaining shared FAs, other than the first shared FA, from the two or more shared FAs.

9. The method of claim 8, further comprising:
    determining the plurality of FAs corresponding to the base station apparatus as a shared FA to which a resource allocation information sharing method is applied and a non-shared FA to which the resource allocation information sharing method is not applied.

10. The method of claim 9, wherein the generating of resource allocation information for the first shared FA among the plurality of FAs and the applying of the generated resource allocation information to the remaining shared FA are performed on a shared FA which is determined to adopt the resource allocation information sharing method thereto.

11. The method of claim 8, wherein the resource allocation information is generated based on the minimum value and a sum of quotients obtained by dividing the necessary resource amounts by the number of shared FAs.

12. The method of claim 11, wherein the generating of resource allocation information further includes:
    allocating a non-allocated resource to a region which is not a target of the resource allocation information sharing method among resources of each of the two or more shared FAs.

* * * * *